United States Patent [19]
Wang et al.

[11] Patent Number: 5,577,364
[45] Date of Patent: Nov. 26, 1996

[54] ON-LINE CONTAINER AND SEAL INTEGRITY TEST SYSTEM

[75] Inventors: Jianjun Wang, Columbus; Billy D. Cornelius, Powell; Ralph A. Gygax, Westerville, all of Ohio

[73] Assignee: Abbott Laboratories, Abbott Park, Ill.

[21] Appl. No.: 562,670

[22] Filed: Nov. 27, 1995

[51] Int. Cl.⁶ ............................................. B65B 57/04
[52] U.S. Cl. ...................................... 53/53; 53/77
[58] Field of Search ..................... 53/53, 54, 75, 53/76, 77, 52, 453, 559, 558, 471, 284.5, 281; 73/49.3; 209/600, 591, 597

[56] References Cited

U.S. PATENT DOCUMENTS

| | | | |
|---|---|---|---|
| 2,485,040 | 10/1949 | Cupo | 53/53 |
| 3,591,944 | 7/1971 | Wilcox | 53/53 X |
| 3,592,049 | 7/1971 | Johanski, Jr. | 53/53 X |
| 3,708,949 | 1/1973 | Wilcox | 53/53 |
| 3,744,210 | 7/1973 | O'Lenick et al. | 53/53 X |
| 4,025,371 | 5/1977 | Pecha | 53/53 X |
| 4,510,730 | 4/1985 | Edmondson | 53/53 |

Primary Examiner—James F. Coan
Attorney, Agent, or Firm—Brian R. Woodworth

[57] ABSTRACT

The present invention provides an apparatus and method for testing seal strength and integrity of packages and for testing container and lid integrity, during an on-line production processing environment. Air pressure is introduced in a unique way to test the container and/or container seal in an additional step of an otherwise typical processing environment. A computer may be in communication with the testing sensors to control the processing in the event a failure is detected. The present invention provides a way to meet the continuously increasing line speed in form, fill and seal production processes with a unique ability of having complete package integrity testing for any odd shapes and package combinations.

15 Claims, 15 Drawing Sheets

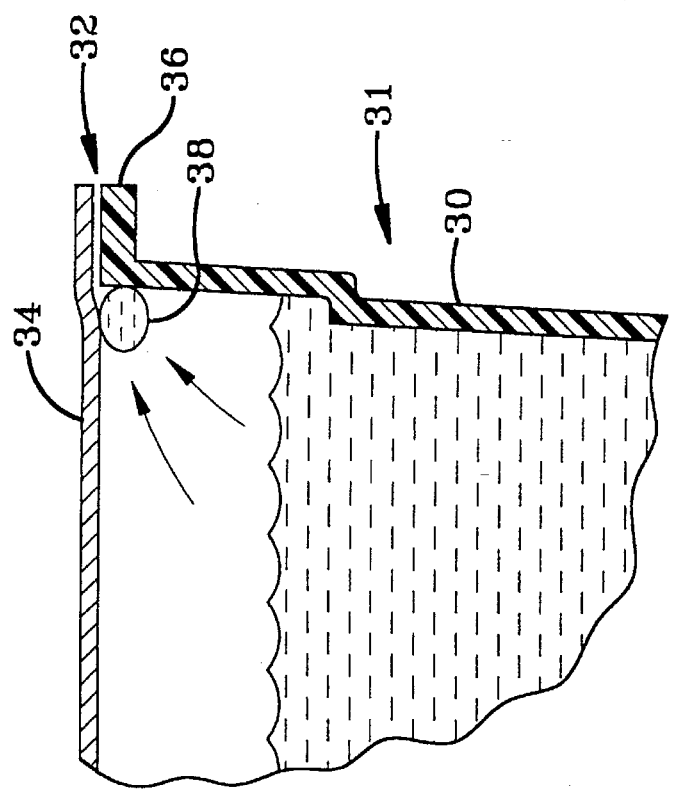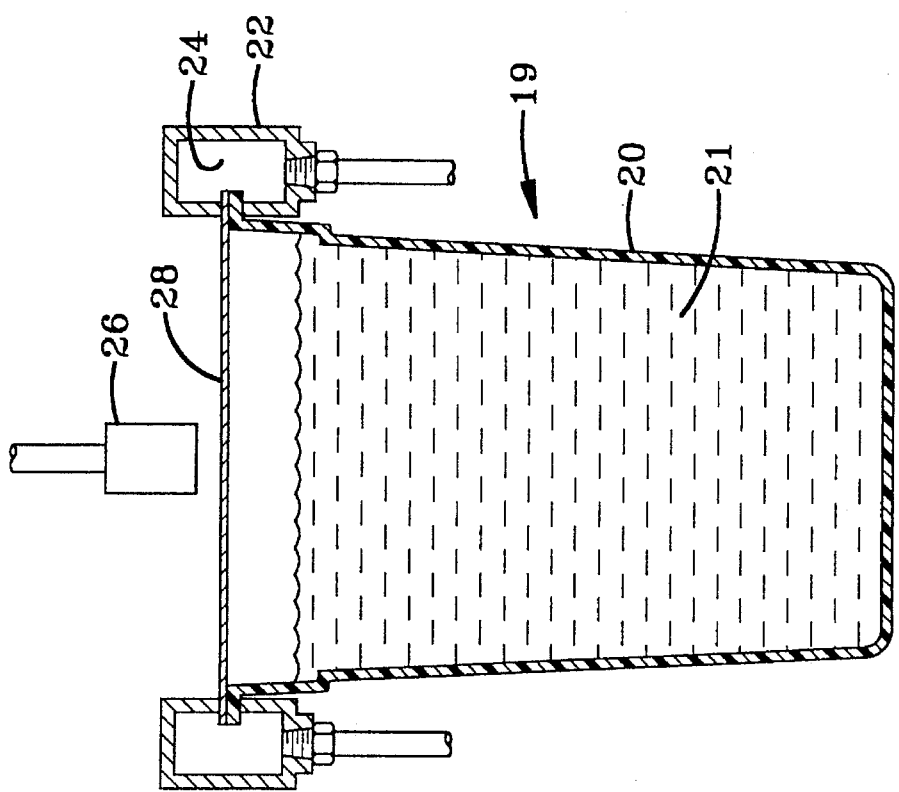
FIG-2 PRIOR ART
FIG-1 PRIOR ART

5,577,364

ON-LINE CONTAINER AND SEAL INTEGRITY TEST SYSTEM

FIELD OF THE INVENTION

The present invention relates generally to packaging and more particularly, to a system for testing the integrity of containers, and seals on containers while the packages remain in their on-line processing environment.

BACKGROUND AND SUMMARY OF THE INVENTION

While the present invention will be described with regards to packages comprising plastic containers of the type that are formed, filled and sealed in a continuous operation many other types of packages would also benefit from the present invention. For example, blister pack containers common in the pharmaceutical industry may benefit from the present invention. Once sealed, a package's seal integrity is of great importance in protecting the contents of the package from damage or spoilage. For example, it is estimated that more than 75% of aseptically processed food and beverage spoilage within packages is caused by seal integrity failure. Although there are existing technologies for detecting the integrity of containers and seals on containers, such technologies all suffer from various drawbacks. Prior to now there has been no ideal method available to test on-line irregular shaped packages the integrity of containers and seals on containers of the form, fill and seal variety.

One known method of testing seal integrity is to impart pressure to a chamber enclosing the package seal to see if the pressure holds or drops. If the pressure holds, then the seal integrity is presumed to be satisfactory. If the pressure drops, it can be determined that the seal has been breached at some location.

A second known method for determining seal integrity is to apply a vacuum to a chamber enclosing the package seal to see if the vacuum force decreases. If there is a pressure decay it is a sign that the seal has a leak in it.

A third known method of testing seal integrity is to apply air pressure in a hoop pattern around the entire edge of the seal. If the air pressure drops, it is an indication that the seal integrity is not satisfactory.

None of the known methods of seal integrity testing is well suited for testing multiple packages at one time in a production line setting. Furthermore, the known methods require movement from station to station and extra handling procedures which can increase the possibility of damage to the packages and cause deterioration to the contents in the packages.

The present invention comprises a unique technique to test the container, seal integrity and seal strength of form, fill and sealed containers, and other packages having sealed cover materials, while on-line. Multiple regular or odd shaped containers may be tested at the same time, within seconds. The tested packages may be shipped without mechanical separation, such as 4, 6, or even 12 packs which are commonly preferred by the consumers for convenience. The present invention is capable of detecting leaks in seals and is capable of testing the seal strength to detect weak seals which were not detectable by other methods. Furthermore, the ability to test any number of packages in one single process stroke makes this invention extremely efficient for continuously increasing processing line speed as seen in today's form, fill and seal production process which traditional test systems and methods do not handle satisfactorily.

BRIEF DESCRIPTION OF THE DRAWINGS

FIG. 1 is a diagrammatic view of a prior art seal integrity test method.

FIG. 2 is a diagrammatic view of another prior art seal integrity test method.

DETAILED DESCRIPTION OF PREFERRED EMBODIMENTS

Figure 3:
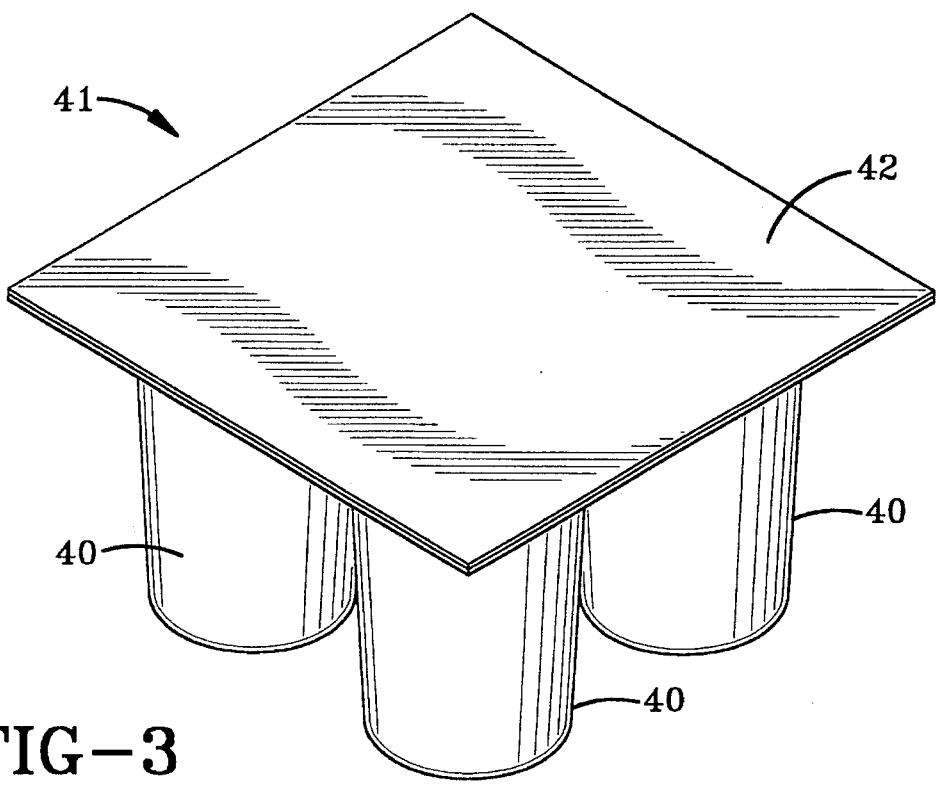
FIG. 3 is a perspective view of a sheet of multiple form, fill and sealed packages.

The present invention is an apparatus for testing the seal integrity of a plurality of packages joined by a web having an air port therethrough, each said package comprising a container having an opening and a lid stock material covering the opening and sealed to the container. The apparatus of the present invention comprises a fixture having a first floor and a second floor; an actuator is associated with at least one of the floors to move it into contact with the other floor; means in association with said first floor for receiving packages in such a manner that a rim of the container of each package rests on an upper surface of the first floor; the second floor having an air track in a bottom surface thereof to create a void pattern for air distribution under the lid stock material adjacent a seal between the container and lid stock material of each package; an air source for providing air to the lid stock material; and a sensor positioned in the apparatus to detect movement of the lid stock material. Preferably the air track is formed in a pattern which lies around the perimeter of the seal rim junction at the edges of the opening of the container of each said package. It is further preferred that the first floor has air ports therein which match the air ports in the web joining the containers. Most preferably the apparatus is incorporated in a production system which performs steps of forming, filling and sealing containers.

Put another way, the present invention is an apparatus for testing a package comprising a container having an opening and a lid stock material covering said opening and sealed to said container for (a) container integrity, (b) seal integrity, and (c) seal strength. This apparatus comprises a fixture having a first floor and a second floor, the first floor having a plurality of voids therein for receiving, respectively, a plurality of packages; the first floor having air injection ports therein which are connected to an air source; the second floor having air tracks provided in a bottom surface thereof, said air tracks being designed to fit over the perimeter of a package's seal of the container and the lid stock material; an air cylinder in association with the second floor to actuate the second floor to move downwardly into contact with an upper surface of the first floor; proximity sensors associated with the second floor and positioned above the lid stock material for sensing movement in the lid stock material during testing; a computer processing unit electrically linked with said sensors for processing and recording output signals obtained from said sensors; and the computer being electrically linked with the air cylinder for actuating said air cylinder and with a valve in association with said air source for actuating the valve.

Referring now to the drawings, and particularly FIG. 1, there is shown a prior art system for testing seal integrity of a package 19 which contains a product 21, such as a food or beverage. As used herein and in the claims a "package" is understood to refer to the assembly of a container with a sheet of lid stock material placed over the opening of the container and attached to the container to form an airtight seal with the container. The package 19, which has a circular horizontal cross-section, is shown as it resides in a portion of a circular clamp 22. The clamp 22 includes an annular air channel 24 into which compressed air is introduced. In this prior art approach an instrument 26 having a proximity sensor is brought near the lid stock 28 on the container 20 to detect movement of the lid stock material. If the lid stock material moves upwardly it does so as a result of air entering the package and the seal is determined to be defective. This prior art testing method requires extra clamps and special container design. This prior art test method cannot detect pin holes in the lid stock material and container other than in the area enclosed in the air channel 24. This prior art test method cannot detect pin holes in the lid stock material and container outside the areas enclosed in the air channel 24. In this prior art approach the pressure applied to the seal area may close a leaking lid during testing.

FIG. 2 is a fragmentary view of a prior art package 31 with a seal integrity failure occurring at the junction 32 of the lid stock material 34 and the rim 36 of a container 30. A vacuum applied to the perimeter of the lid stock material where it contacts the container 30 would indicate seal failure by virtue of a pressure drop during the vacuum test. A drawback of this prior art test method is that condensate or other blockage 38 in the area of the flow in the seal may cause the vacuum force to be maintained, even if the seal is defective. Another drawback of this prior art test method occurs with flexible container materials. Under vacuum, flexible containers may render false seal failure signals due to the container flexing while under vacuum. The driven force for the vacuum test is limited to one atmosphere which limits the sensitivity of this prior art test method.

Figure 4:
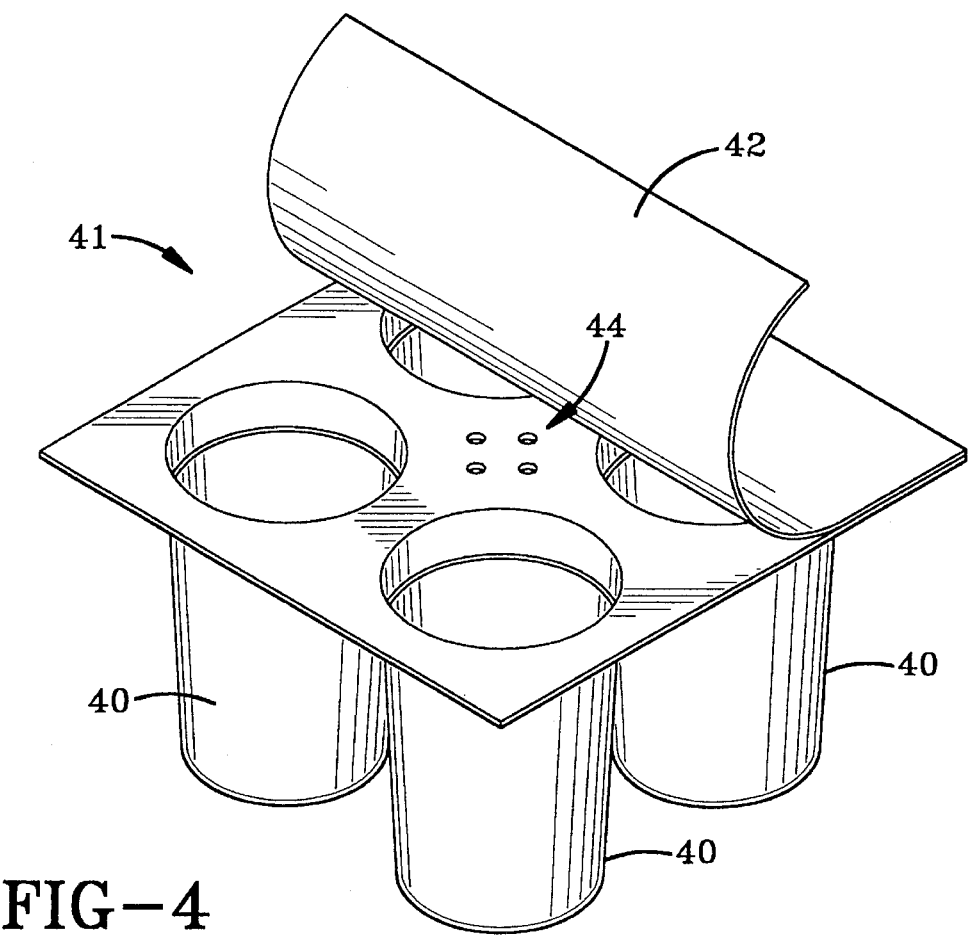
FIG. 4 is a perspective view of the array of containers shown in FIG. 3, revealing a sheet of seal material thereon.

Referring now to FIGS. 3 and 4, an array 41 of a plurality of formed, filled, and sealed packages is shown prior to die cutting (while this can be extended to an unlimited number of containers, only four are shown here for description purposes). The formed containers 40 shown in FIG. 3 and 4 are known to those skilled in the art, and are commonly used in the food, beverage, and drug industries. In FIG. 4, the sheet of lid stock material 42 that is typically heat sealed onto the containers is shown partially removed to reveal one or more apertures 44 that may be punched out along with the container forming procedure in the common container forming material between adjacent containers.

Figure 5:
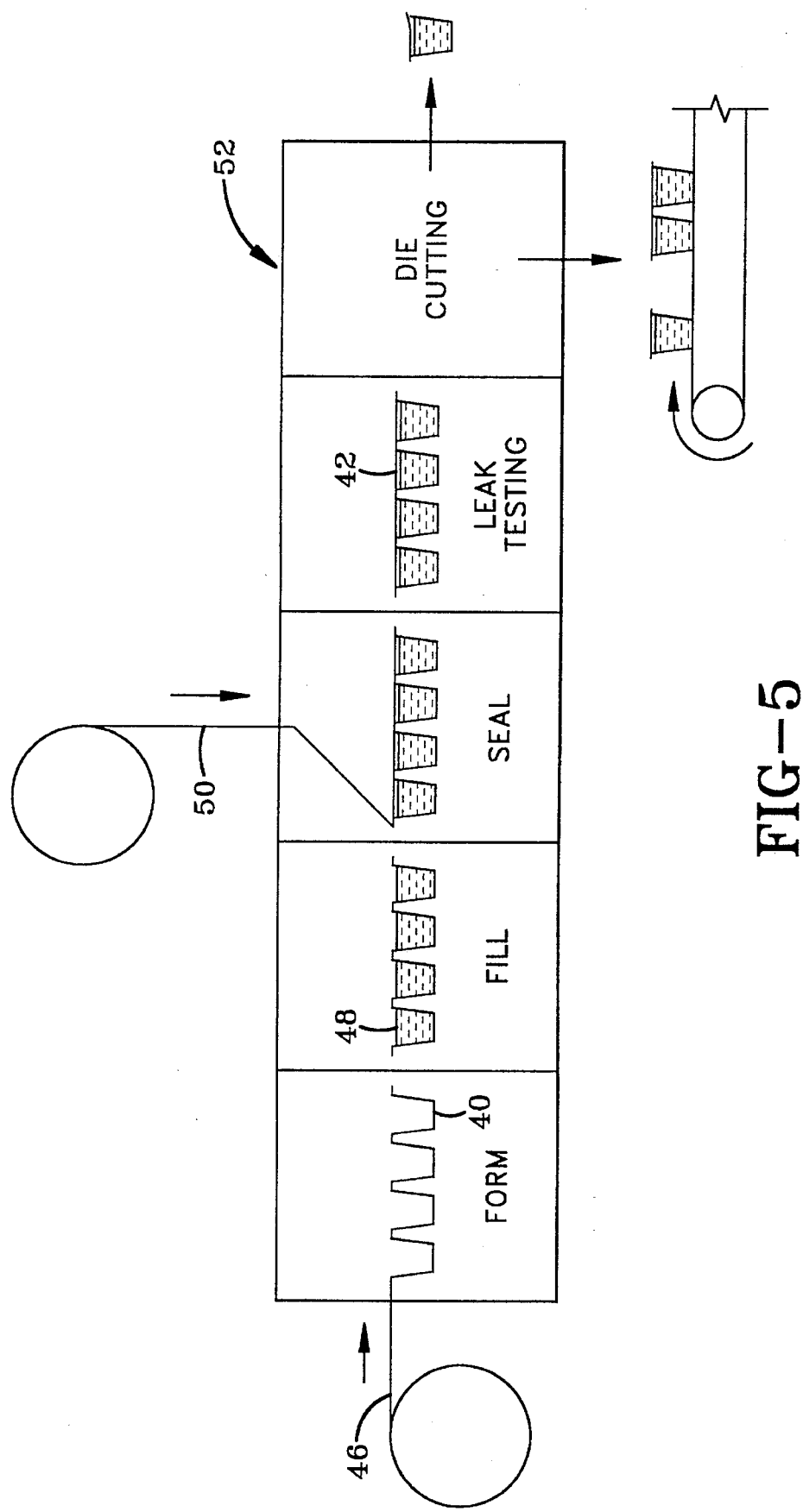
FIG. 5 shows a five-step form, fill and seal aseptic production process incorporating the present invention.

Referring now to FIG. 5, a diagram is shown which presents a manufacturing process in which a sheet 46 of container material is formed into a series of container shapes 40. The containers may comprise materials such as a polypropylene/EVOH/polypropylene multilayered laminate. After the container shapes have been formed, the product 48 is directed into each container 40 in a manner known to those of ordinary skill in the art. A second roll of sheet material 50, referred to herein and in the claims as lid stock material, for the closure on each container is then applied to cover the opening of each container. The lid stock material may be produced from several different materials, for example, polypropylene/aluminum foil/polypropylene and the like, as known to those of ordinary skill in the art. The present invention is not limited to the aforementioned materials and combinations thereof, but would work equally well with other materials commonly used in industry.

In the next step of the process, the seals 43 (area under seal material 42 in contact with container material 40) are tested to be sure that they are intact and no leaks are present in the seals. This process is extremely important in several industries. In the aseptic packaging industry, for example, if leaks are present in the seals of the containers, bacteria will invade the container which will lead to spoilage of the product. After the seals are tested for their integrity, a final die cutting step 52 may be accomplished which separates each container from the web of material adjoining all of the containers so that individual product containers may be shipped or cut according to marketing preference such as four, six or twelve packs.

Figure 6:
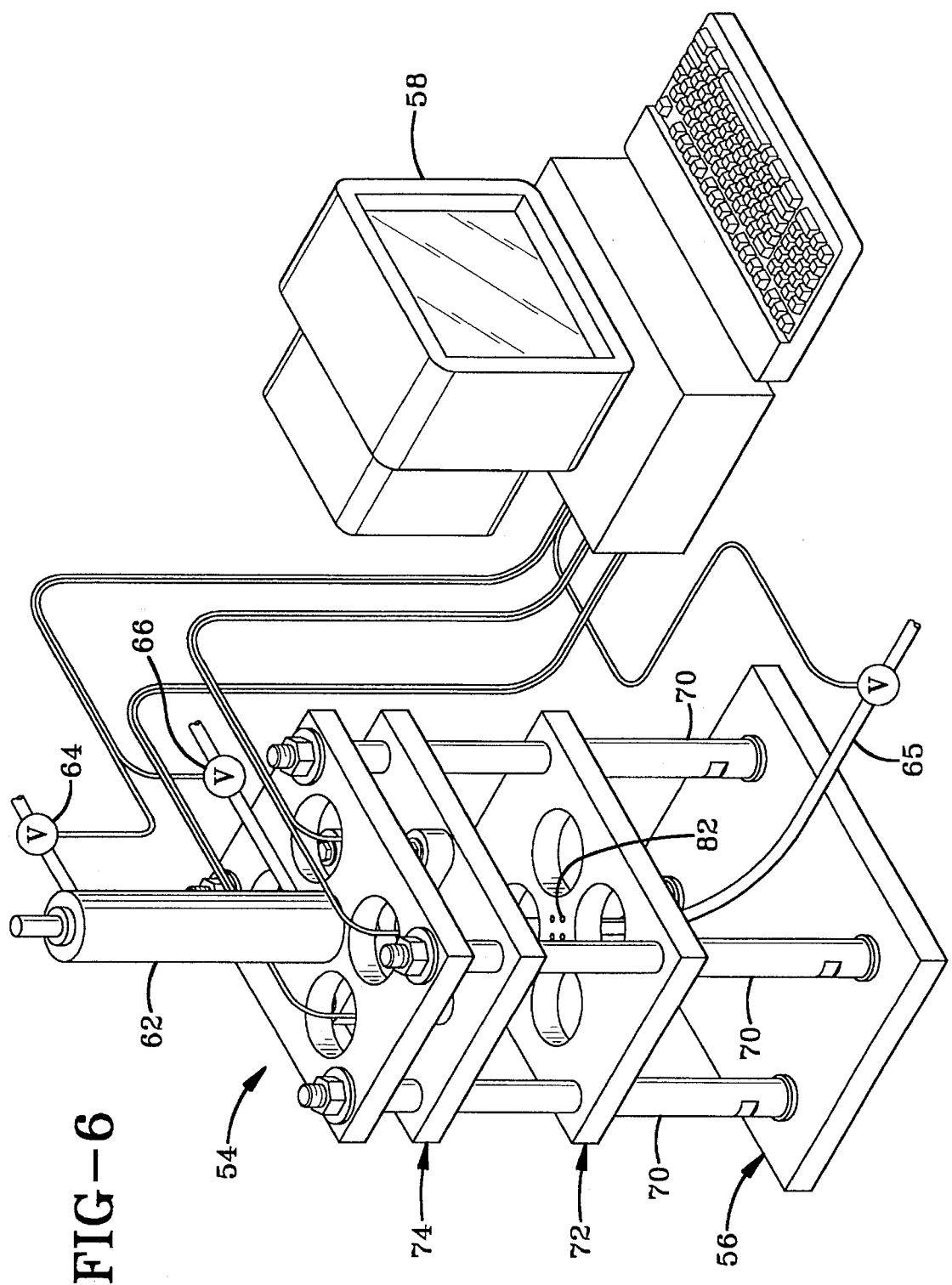
FIG. 6 is a perspective view of a preferred embodiment of an apparatus for use with the present invention.
Figure 7:
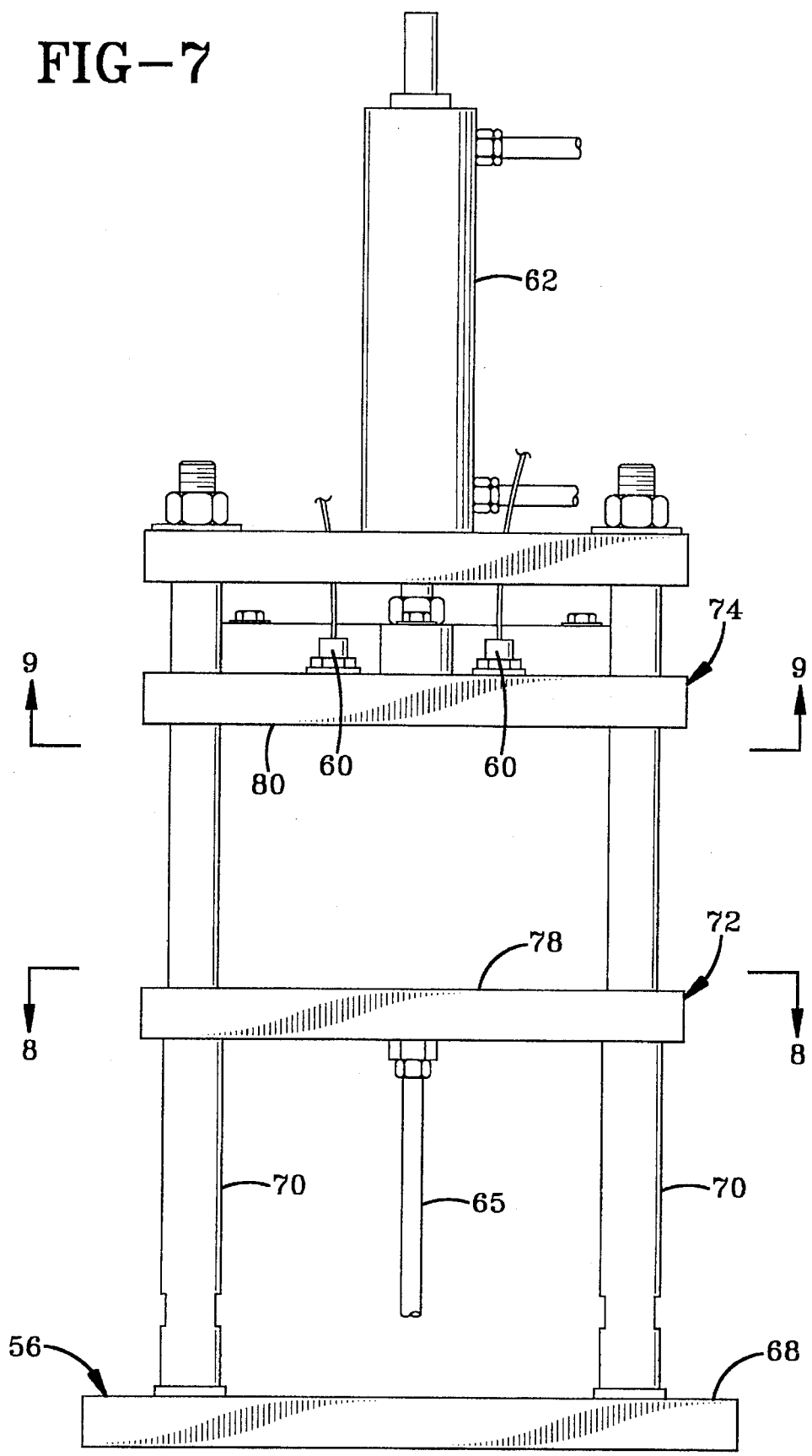
FIG. 7 is an elevational view of a preferred embodiment of a seal integrity press mechanism of the present invention.

Referring now to FIGS. 6 and 7, an apparatus 54 is shown for testing the seal integrity of the aforementioned containers. The apparatus comprises a fixture 56, a computer 58 for monitoring the seal integrity testing, and sensors 60 (shown in FIG. 7) which communicate electronically with the computer. The fixture 56 includes an air cylinder 62 having first 64 and second 66 input/output valves and an air injection source 65 for supplying air under positive or negative pressure for conducting the tests.

Figure 8:
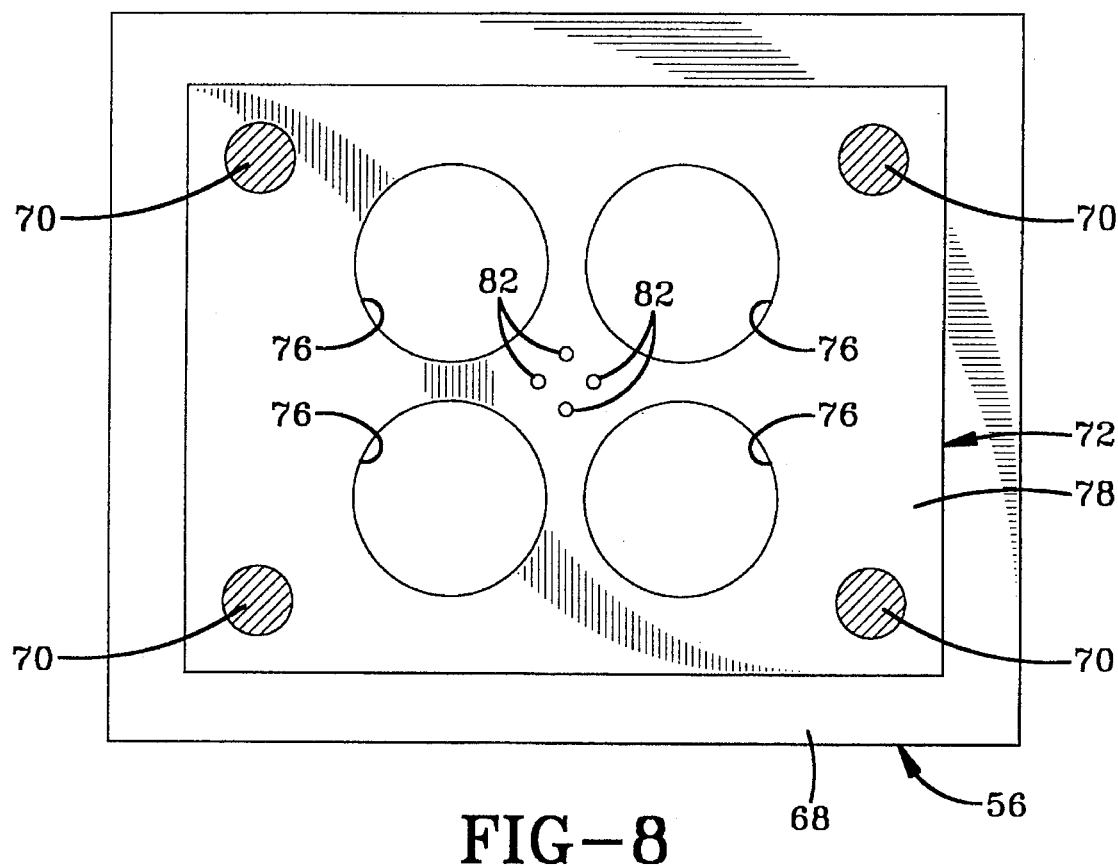
FIG. 8 is a sectional view taken in the direction of lines 8—8 of FIG. 7.

Referring to FIG. 7, the fixture is shown in greater detail. In this embodiment, the fixture 56 includes a platform 68 having support members 70 and a first 72 and second 74 floor. The first floor 72 of the fixture is shown in FIG. 8 and reveals a plurality of openings 76 which can accommodate containers placed in each opening. Air injection ports 82 are preferably located in this preferably located in this floor and preferably match the pattern shown at 44 in FIG. 4. Air is received into ports 82 from the air source 65. The surface 78 of this floor 72, shown in FIG. 8, is preferably solid except for the container openings, supports, and air ports 82. In this embodiment a series of four openings 76 are included in the first floor. During the production process, after the containers have been sealed, four containers would be moved into the fixture and lowered into the four openings 76. While the openings 76 are shown as being round, it is understood that they may be any shape which is complementary to the cross-sectional shape of the containers being tested. The first floor 72 is preferably made of stainless steel. As will be shown later, the floor may be designed to move up as an alternative way for accomplishing this procedure.

Figure 9:
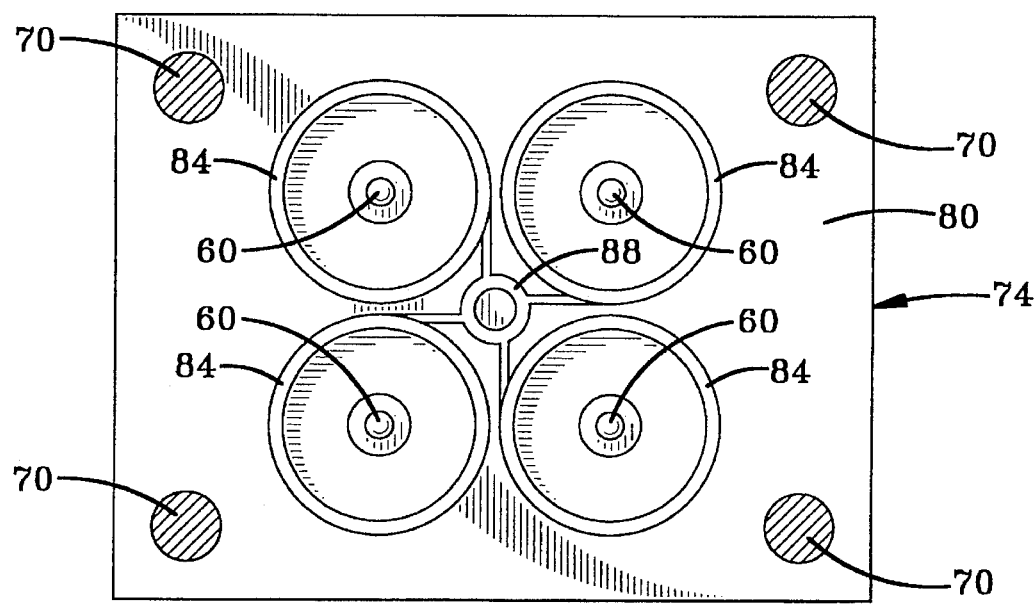
FIG. 9 is a view taken in the direction of lines 9—9 of FIG. 7.

FIG. 9 shows the surface 80 of the second floor 74 of the fixture 56. The bottom surface 80 of the second floor includes a series of air void tracks 84. Preferably, the air void tracks 84 are placed in a pattern that results in the air tracks 84 being of a slightly larger diameter than the outer diameter of the seal rim junction 86 (see FIG. 10) at the opening of each of the containers 40. The air tracks originate from a preferably ring-shaped air receiving void chamber 88. The ring shape is advantageous because it radially disperses the incoming air pressure around the seal material, in an orderly manner, thereby avoiding the chance that air cutting may occur which can potentially harm a seal's integrity. It is important to note that air does not directly enter the air tracks 84. The air tracks are voids which allow the unsealed portions of the seal material to rise in the voids to allow air flow therethrough in a pattern that duplicates the air tracks' pattern, as will be described below with reference to FIGS. 11, 11A and 11B. The pattern is predetermined to result in air flow directed entirely around the sealed areas of each container opening. Without the air tracks in the second floor, the air introduced under the seal material would disperse randomly and offer little value in seal integrity testing. The surface 80 of the floor shown in FIG. 9 is preferably planar except for the air tracks 84 and air ring 88 and the locations of the supports. Both floors are preferably made of stainless steel. The two rigid floors serve as a mechanical support and seal for the testing process. They cooperate to provide air flow channels and prevent errors which may be caused by flexibility of the plastic materials.

Figure 10:
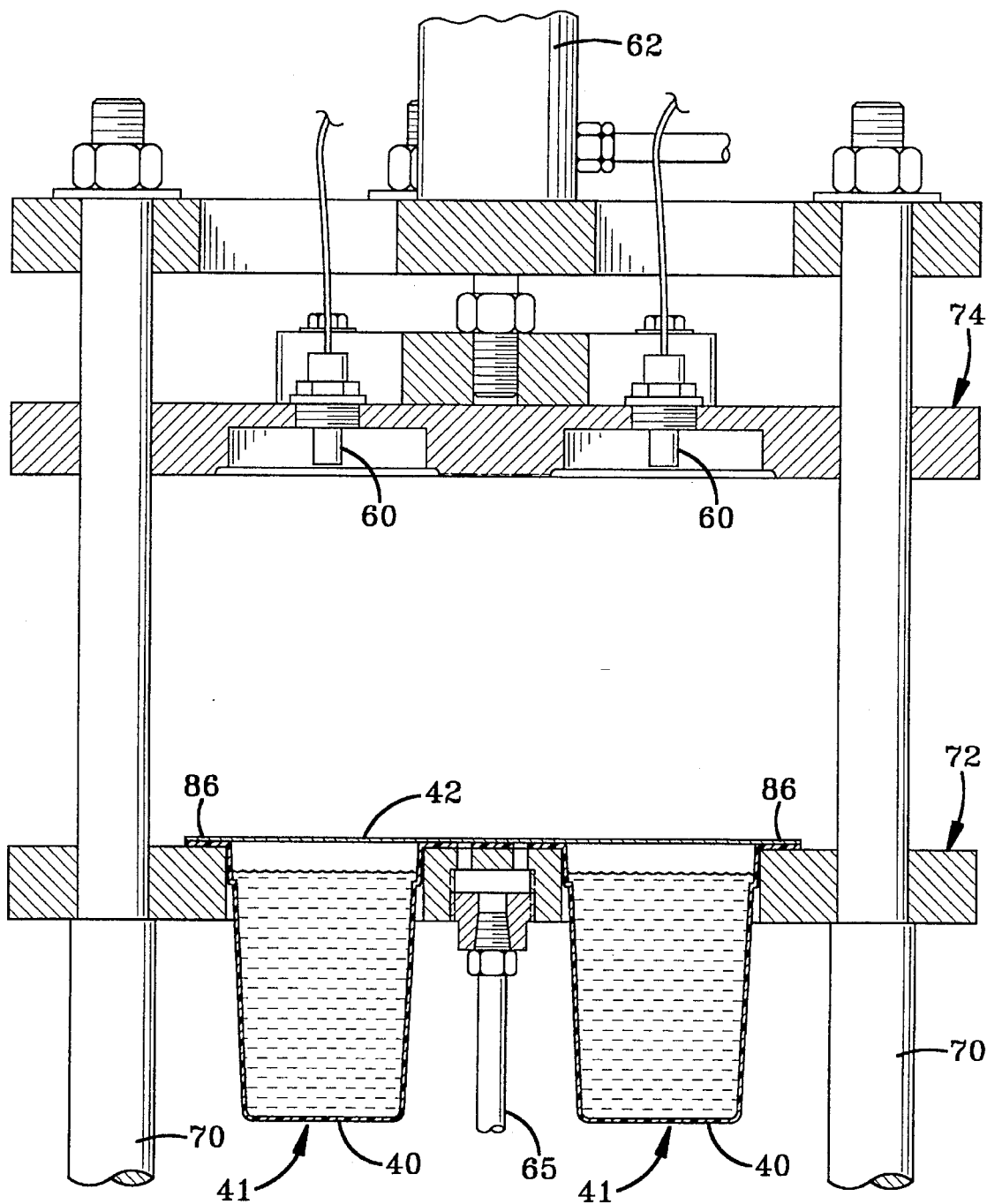
FIG. 10 is a fragmentary sectional view of the press mechanism of the apparatus of the present invention having containers in line therewith.

In FIG. 10, two packages 41 are shown in the first floor 72 of the fixture 56 and proximity sensors 60 (or any displacement sensors, such as laser beams) are located in the second floor 74 of the fixture directly centered above the packages. The proximity sensors may be mounted by conventional fasteners to the second floor. The air cylinder 62, or other conventional device, may be used to move the first and second floor into contact with one another.

Figure 11:
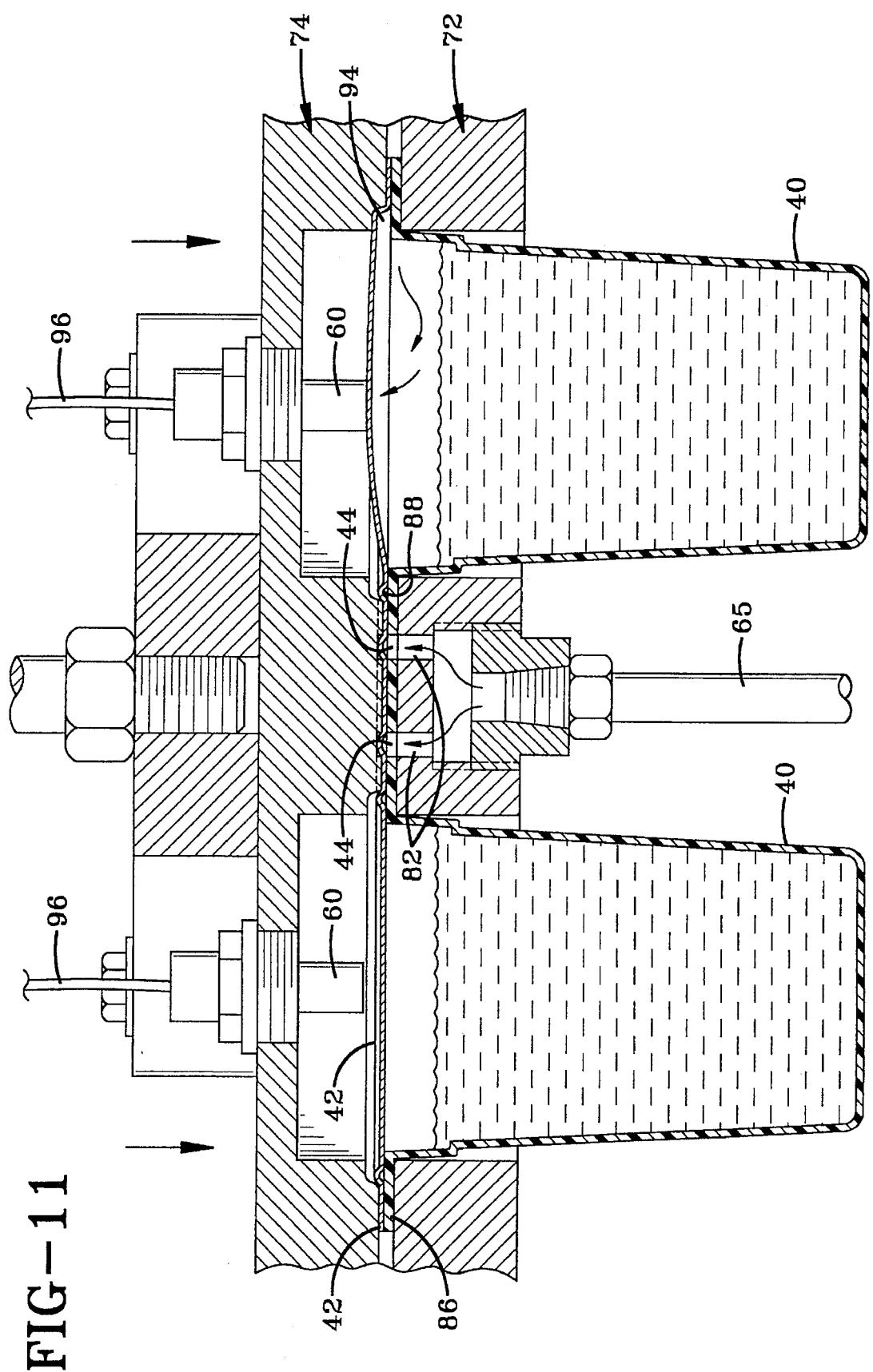
FIG. 11 is an enlarged fragmentary sectional view of the embodiment of FIG. 10 with a seal integrity test of the present invention in progress.
Figure 11A:
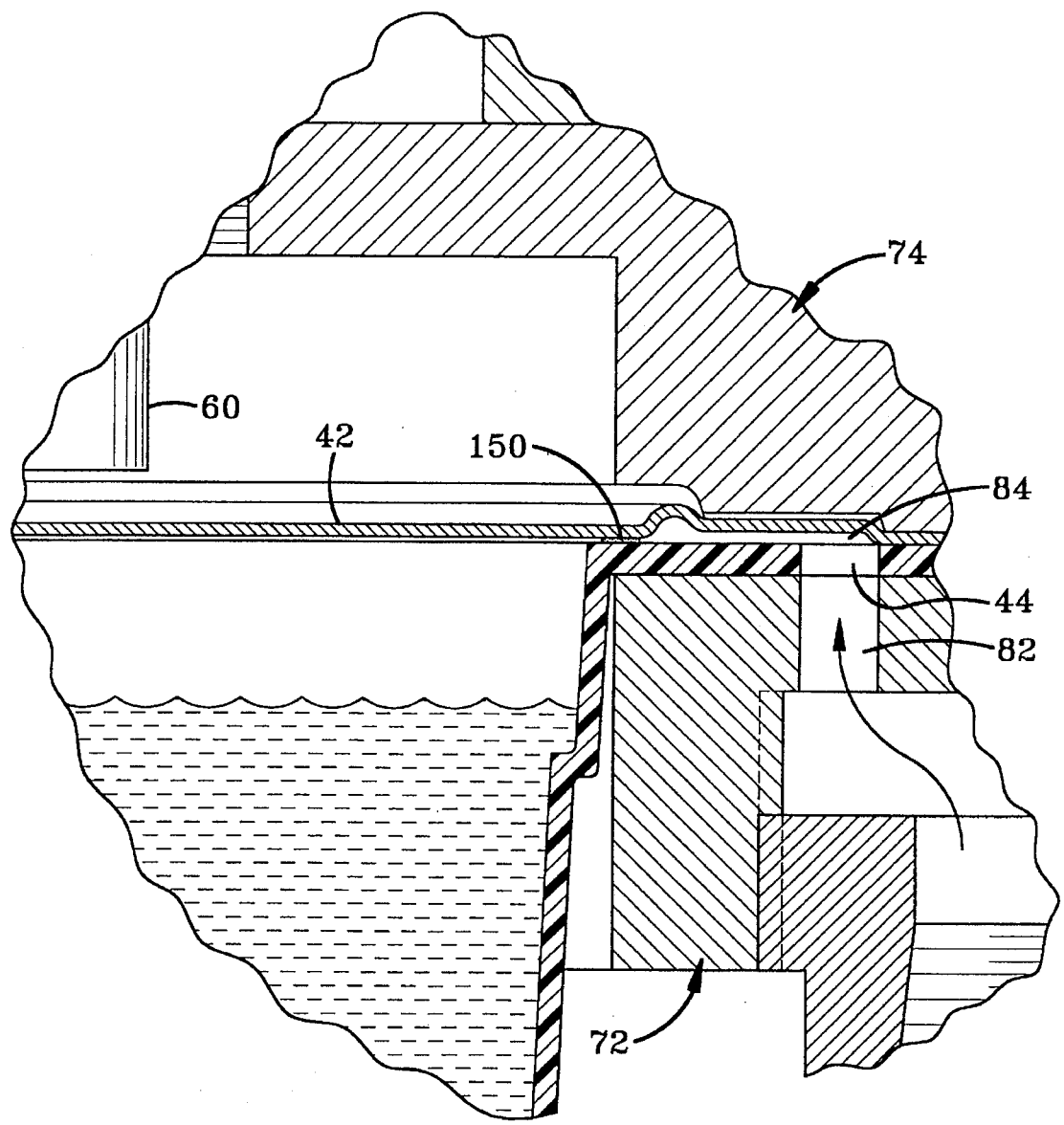
FIG. 11A is an enlarged fragmentary view showing the testing of a package having a good seal between the container and the lid stock material.
Figure 11B:
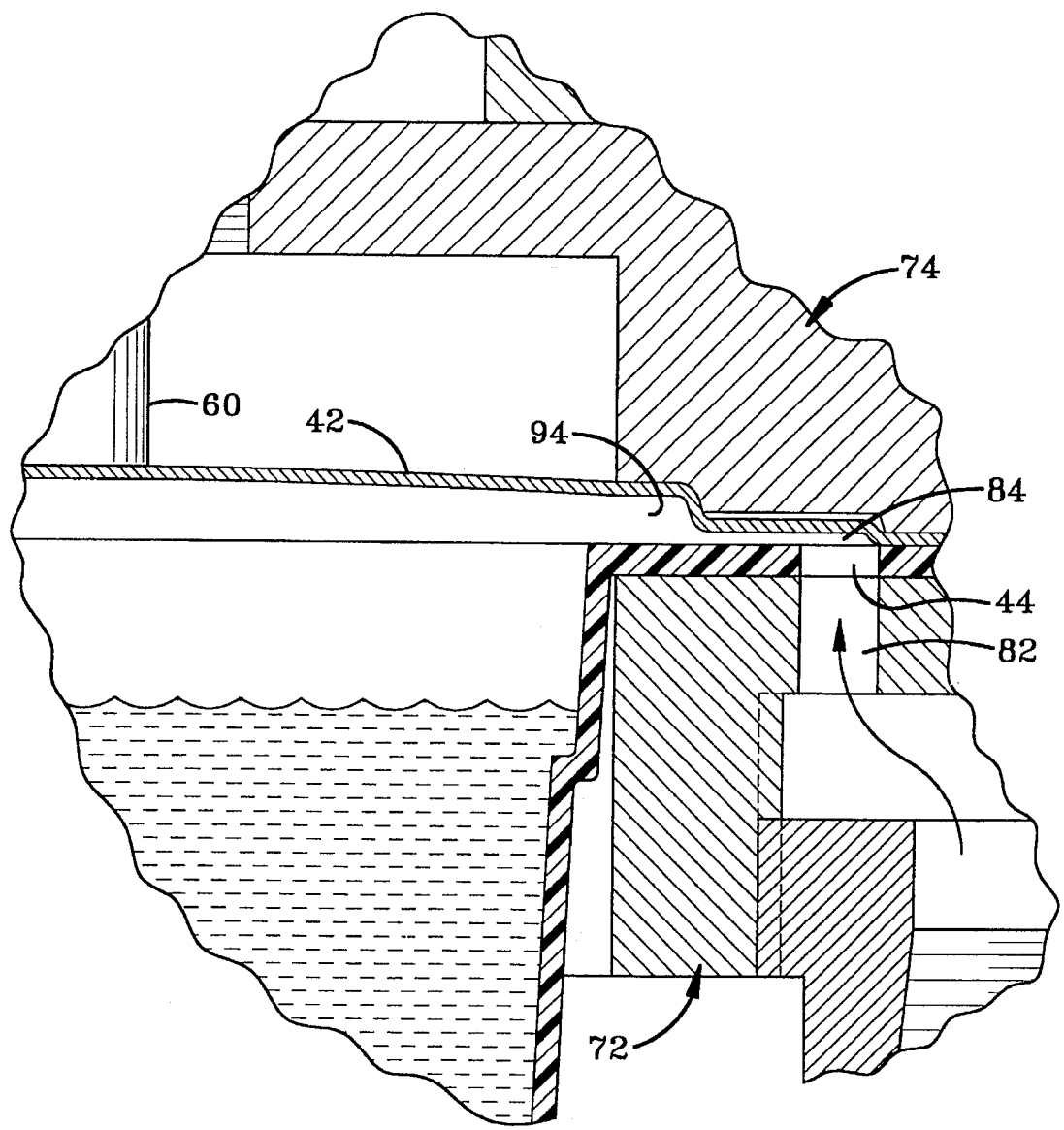
FIG. 11B is an enlarged fragmentary view showing the testing of a package having a defective seal between the container and the lid stock material.

In FIGS. 11, 11A and 11B the second floor 74 of the fixture has moved in a downward direction to reside immediately above and in contact with the lid stock material 42 of the packages 40. The first and second floors come together tightly to hold the containers rigidly within the fixture while testing occurs, and serve to prevent air from escaping out of the air tracks. Air is injected through the air injection ports 82 and immediately travels through apertures 44 into the air ring 88 and through the air tracks 84 around the container perimeters. In FIG. 11, the right hand package is shown, having experienced a failure 94 in its seal which is shown in greater detail in an enlarged fragmentary view in FIG. 11B. Air has seeped into the package from the air tracks due to a breach in the package seal. The air flowing into the container has caused the remainder of the flexible seal material to rise slightly to cause a response in the proximity sensor 60. The pressure of the testing air acting on the seal junction will function as a peeling force. The force is a function of the air pressure and the depth of the void channels 84. When there is a weak seal, the lid will be lifted up under the effect of the peeling force which will cause a displacement of the lid stock material which will be detected by the sensor 60. The electrical lead 96 from the proximity sensor to the computer will transmit a signal to the computer indicating that the seal has been penetrated and the computer can be programmed to cause the production system to identify and reject the failed package(s).

In contrast, the left hand package in FIG. 11, which is shown in greater detail in an enlarged fragmentary view in FIG. 11A, has a good seal 150 which prevents the lid stock material from being peeled away from the rim of the container by the air pressure or air penetrating the seal through a channel of the type formed in some defective seals.

Figure 12:
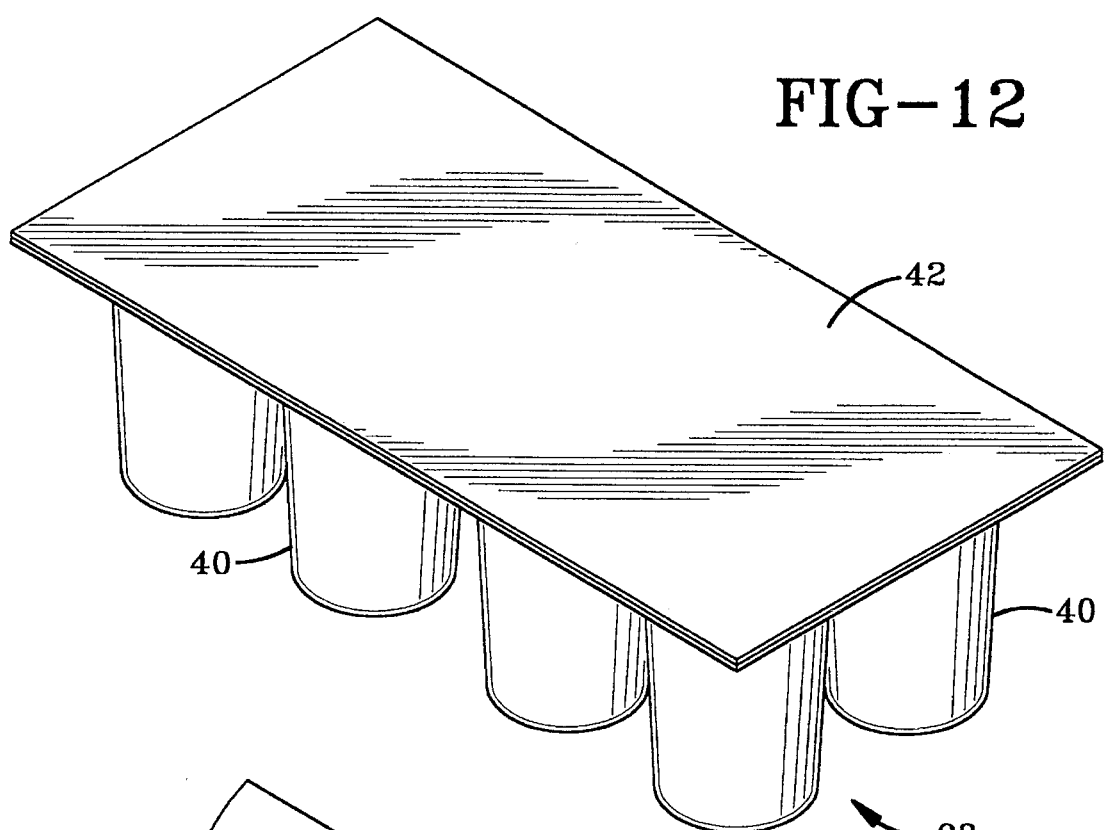
FIG. 12 is a perspective view of another embodiment of multiple form, fill and sealed packages.
Figure 13:
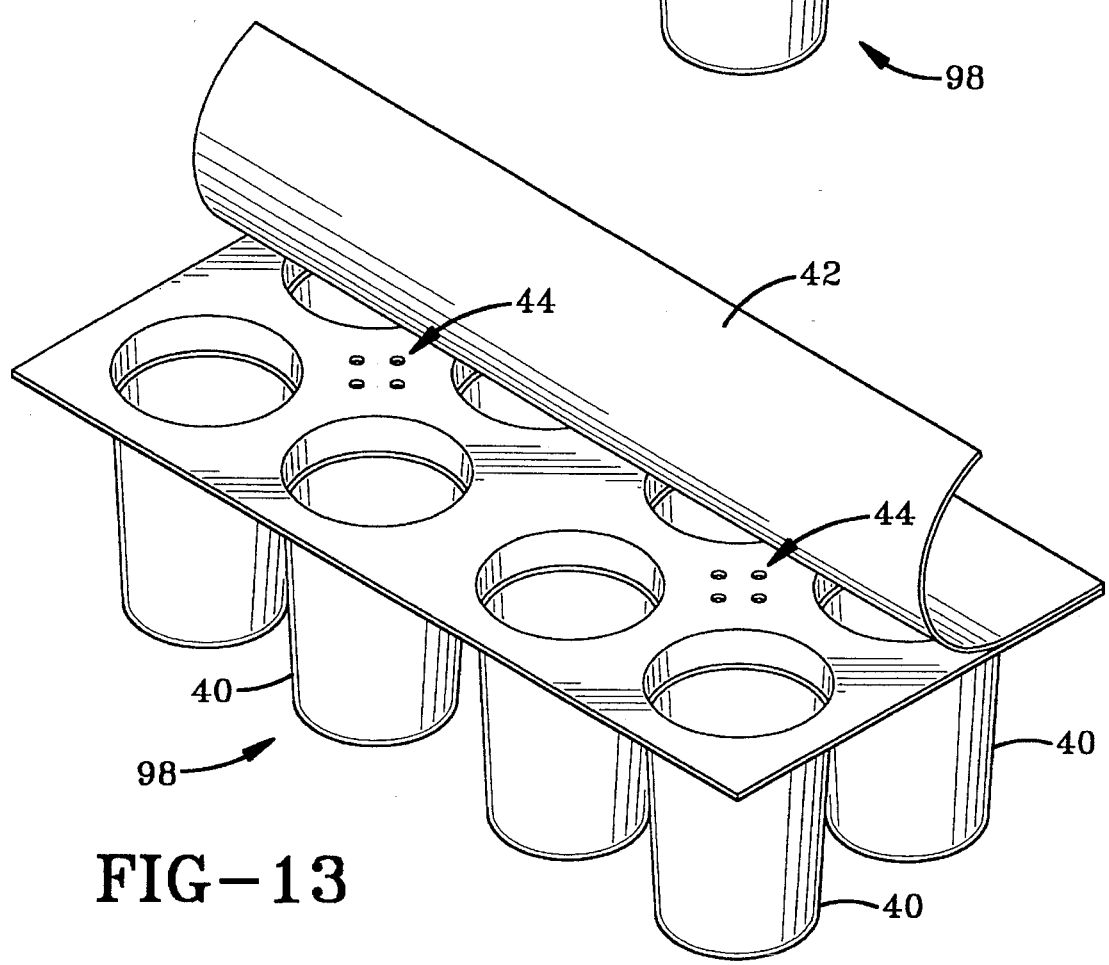
FIG. 13 is a perspective view of the array of packages of FIG. 12 revealing a sheet of seal material.

FIGS. 12 and 13 show another embodiment of the packages which may be tested using the present invention. FIGS. 12 and 13 are analogous to FIGS. 3 and 4. FIGS. 12 and 13 illustrate the concept that a great number of packages may be tested at the same time using the present invention. The fixture may be enlarged to accommodate a greater number of packages at one time. Multiple fixtures and odd shaped packages may also be used at one time. Furthermore, with multiple package arrays 98, such as shown in FIG. 12, an additional cooling step plus a container integrity test may be performed immediately prior to a seal integrity test. It is preferred to allow time for the seals to cool before testing so that a heat seal can solidify to achieve full strength. A cooling step provided in the process may set seals at their normal strength as designed and avoid false rejections, so the testing does not damage the seals. FIG. 13 also illustrates a choice when large numbers of packages are to be tested at the same time. Several separated apertures 44 and channels may be designed corresponding to the specific requirements such as four, six, or twelve packs, to reduce the time for air filling and increase the sensitivity of the tests.

Figure 14:
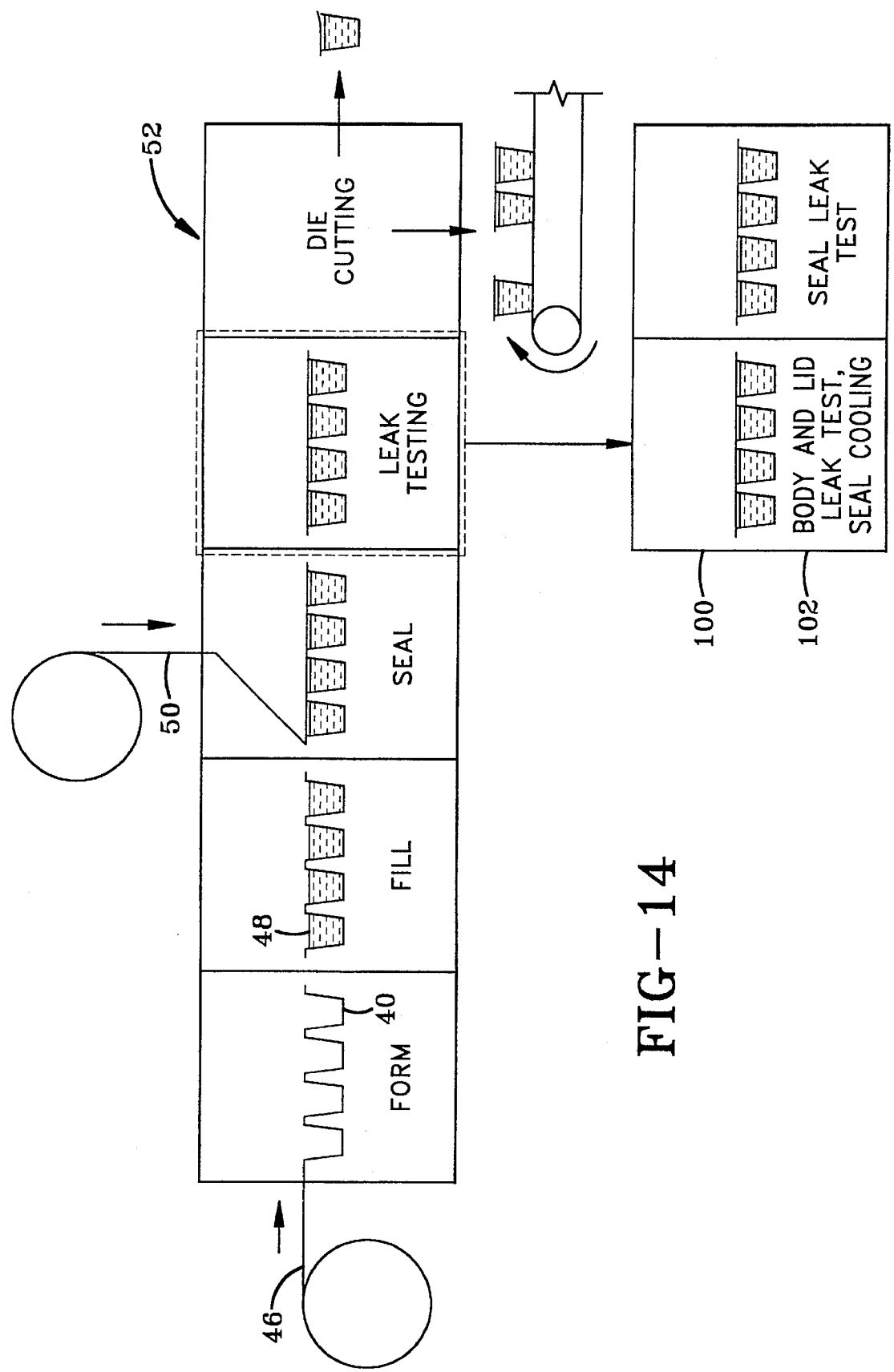
FIG. 14 shows another embodiment of the present invention involving a six-step form, fill and seal aseptic production process.

FIG. 14 is analogous to FIG. 5 and includes an additional step of a leak test 100 for the container and lid stock material, and a seal cooling step 102 for cooling the seals just prior to testing the seals. Seal cooling may be necessary if the seals are activated in a heat bonding step as is often the case and when the time interval between each process stroke is small. Several approaches may be used to cool the seals prior to testing. For example, cool air may be passed over the lid stock material after it has been applied to the containers. Also, the second floor of the apparatus of the present invention may be chilled with a coolant fluid and, once brought into contact with the lid stock material on the containers, would cause the seals to cool rapidly just prior to testing.

Figure 15:
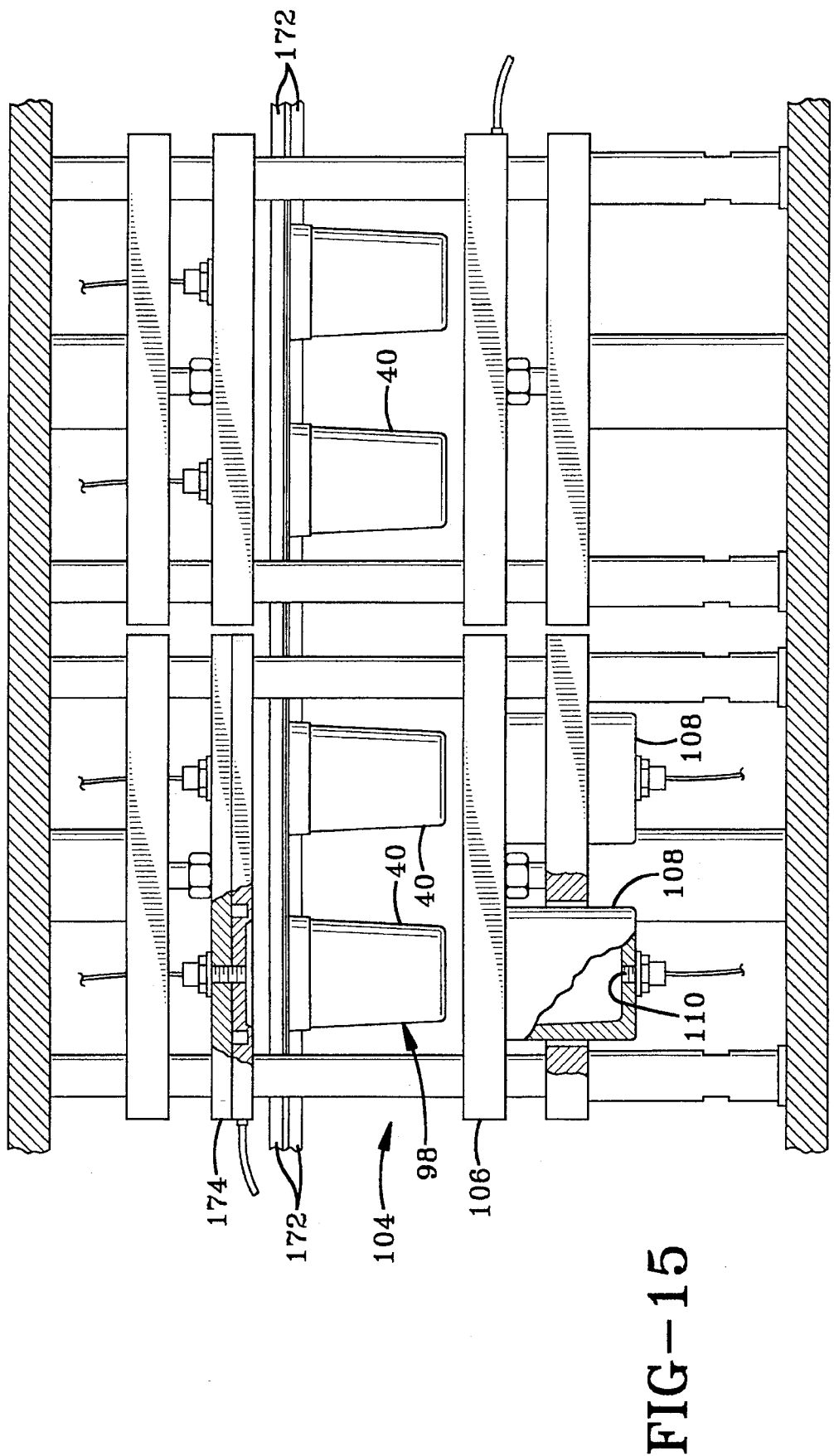
FIG. 15 shows an elevational view of another embodiment of the testing system of the present invention.

FIG. 15 shows another embodiment of the present invention in which a fixture 104 has an additional floor 106 residing below the packages 40, which rises (by air pressure, for example) to enclose each container within a shell 108. Each shell 108 is preferably designed to approximate the size and shape of the container, to fit over the container in relatively close proximity thereto. This embodiment may be incorporated into a form, fill, and seal production process as a station for seal and container integrity tests. A transfer mechanism clamps onto the edge of the array of containers and advances the array through the testing system during the time interval between vertical strokes of the testing apparatus which move the various floors 106 and 174.

Figure 16:
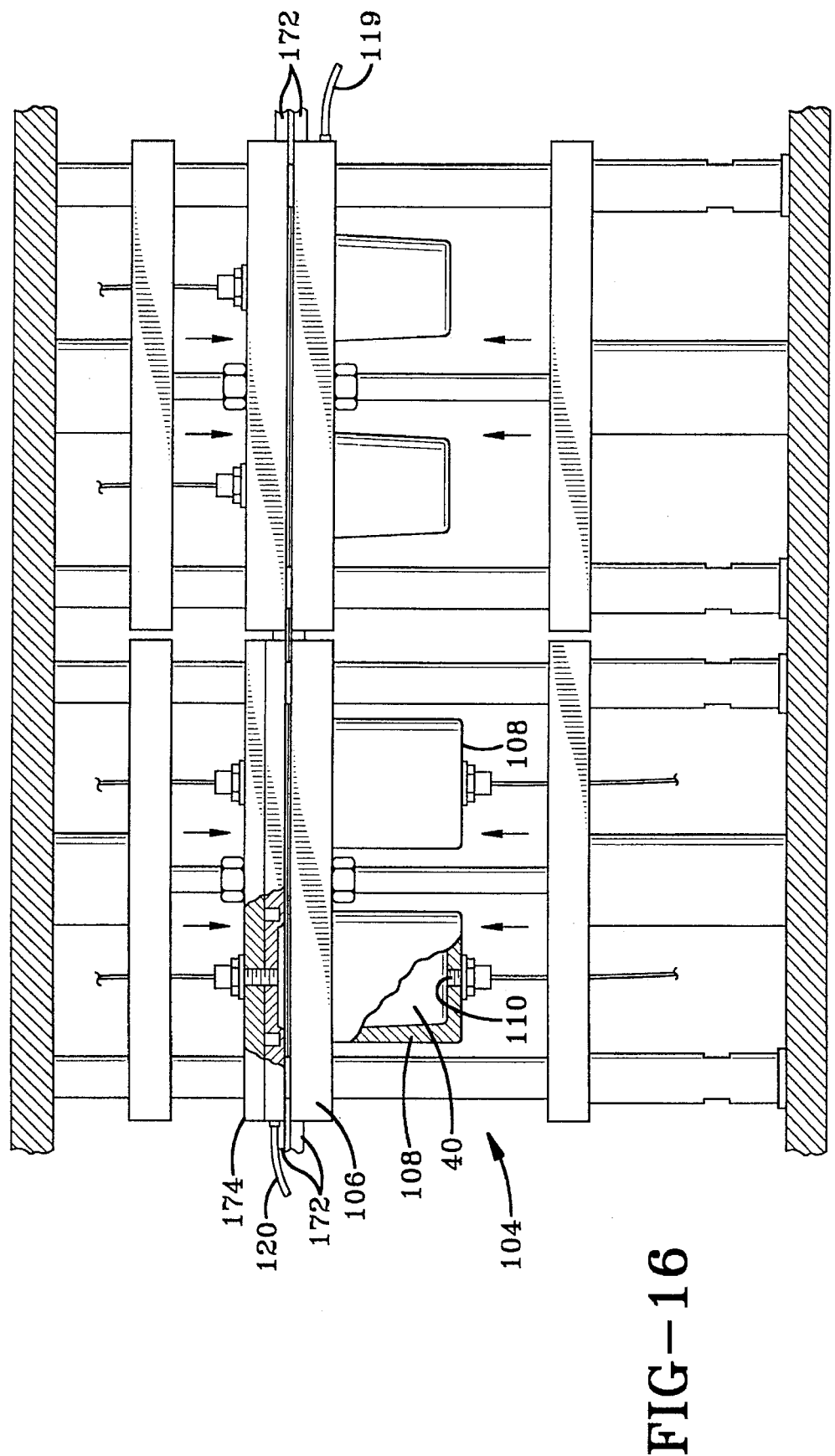
FIG. 16 shows a second step in the process shown in FIG. 15.
Figure 17:
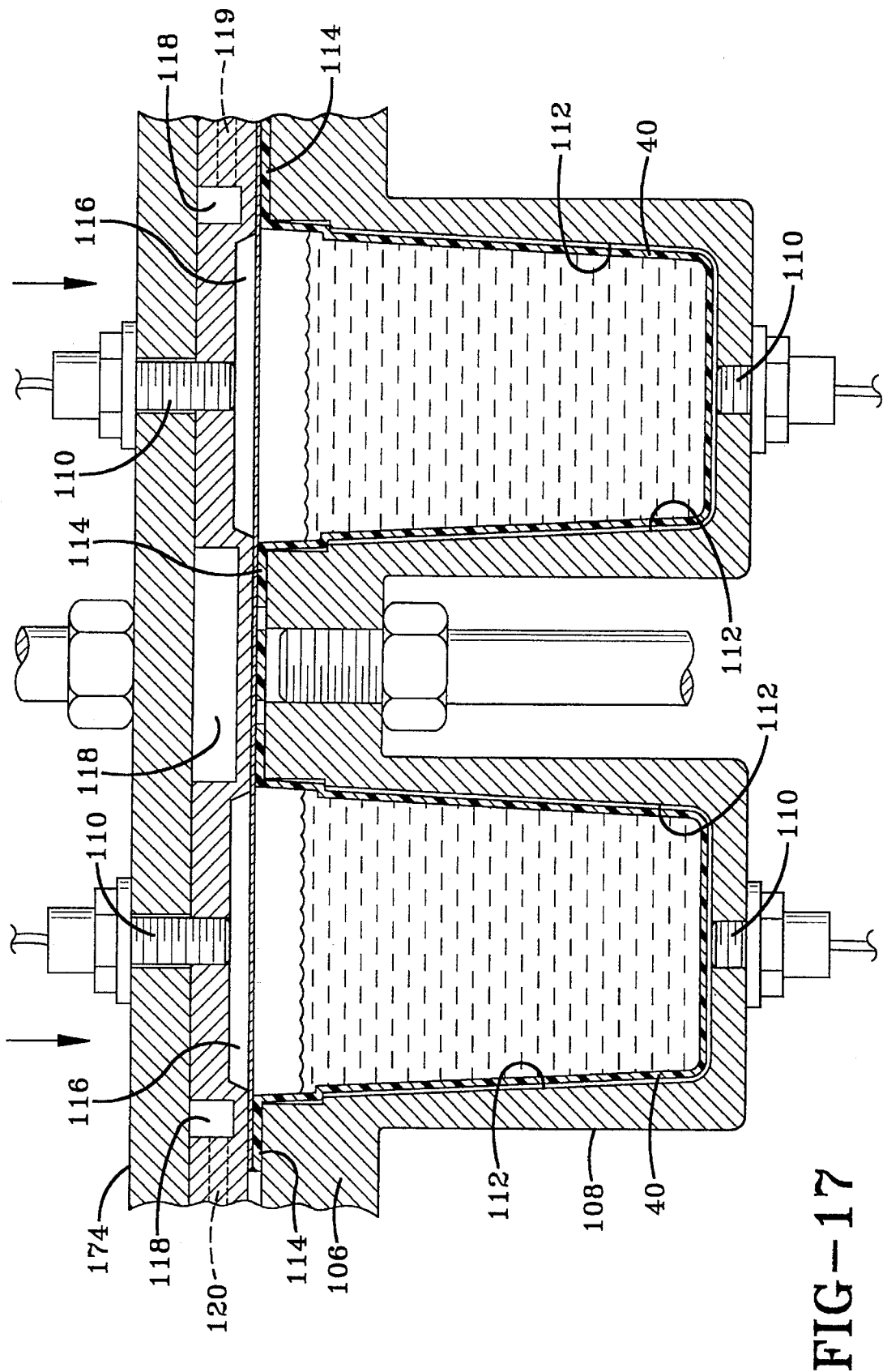
FIG. 17 is an enlarged partial sectional view of a portion of the test system shown in FIG. 16.

In FIG. 16, the additional floor 106 of the fixture has been raised to a position which simulates a step in a testing process where the shells 108 have now surrounded the containers 40. In FIG. 17 vacuum ports 110 are shown mounted to the bottom of each shell 108 and over the lid of each container. The package integrity test may be accomplished with an air vacuum around the container and lid to check for a vacuum pressure drop which would indicate a failure in the integrity of the container or lid stock material. The container vacuum chamber 112 is sealed near the container rim 114. The top or lid vacuum chamber 116 is also sealed near the container rim. The top vacuum and bottom vacuum chambers are preferably not in fluid communication with each other.

Cooling tunnels 118 may be provided to assist in cooling the heated seals between the containers and the lid stock material. Cool air or fluid may be injected into ports 119 that flow to the tunnels right above the container seals and exit from ports 120. Continuous circulation of the cooling fluid makes the seals cool down quickly and reach a normal designed seal strength level.

There is provided in accordance with the present invention a method for testing the integrity of a plurality of packages, each said package comprising a container having an opening and a lid stock material covering said opening and sealed to said container. The testing method comprises the steps off providing an apparatus in which to hold packages to conduct the testing, the apparatus comprising a fixture having a first floor and a second floor; an actuator in association with at least one of said floors to move one of said floors into contact with the other of said floors; means in association with said first floor for receiving said packages in such a manner that a rim of the container of each package rests on an upper surface of said first floor; said second floor having an air track in a bottom surface thereof to create a void pattern for air distribution under said lid stock material at a seal between the container and lid stock material of each said package; an air source for providing air to said lid stock material; and a sensor positioned in the fixture to detect movement of the lid stock material; arranging said packages into said first floor of said apparatus, such that said packages rest in said means for receiving in said first floor; moving said second floor of said apparatus into contact with the lid stock material of said package as said package rests in said first floor; injecting air into said air track under said lid stock material to cause said lid stock material to rise at corresponding locations into said air tracks; detecting movement of lid stock material with said sensors; and employing a computer to monitor movement of the lid stock material detected by said sensors, and to control said actuator, air source and the testing process.

The computer may be integrated with a production processing system, so that as defective seals are discovered the production process controls act to identify a container having a breached seal for removal prior to shipment. Preferably the shells rest in an additional floor forming a part of said apparatus. The testing method may also include bringing a plurality of shells into a position surrounding the container of one of said packages; and providing air vacuum/pressure in a void between said shells and said container bodies and lids, to test for vacuum/pressure differences. Preferably the testing method includes cooling the seals between the cups and lid stock material prior to testing the integrity of said seals, which may be accomplished by injection of a cool fluid into cooling tunnels formed in said second floor. The containers of the packages tested preferably comprise a flexible material such as polypropylene/EVOH/polypropylene layers. The lid stock material of the packages tested preferably comprises a flexible, multilayered material such as polypropylene/aluminum foil/polypropylene layers.

While various embodiments of the present invention have been described in detail herein and shown in the accompanying drawings, it will be evident that various further modifications are possible without departing from the scope of the invention.

What is claimed is:

1. An apparatus for testing the seal integrity of a plurality of packages joined by a web having an air port therethrough, each said package comprising a container having an opening and a lid stock material covering said opening and sealed to said container, said apparatus comprising: a fixture having a first floor and a second floor; an actuator in association with at least one of said floors to move one of said floors into contact with the other of said floors; means in association with said first floor for receiving said packages in such a manner that a rim of the container of each package rests on an upper surface of said first floor; said second floor having an air track in a bottom surface thereof to create a void pattern for air distribution under said lid stock material adjacent a seal between the container and lid stock material of each said package; an air source for providing air to said lid stock material; and a sensor positioned in the apparatus to detect movement of the lid stock material.

2. The apparatus of claim 1, wherein said air track is formed in a pattern which lies around the perimeter of the seal rim junction at the edges of the opening of the container of each said package.

3. The apparatus of claim 2, further comprising air ports in said first floor matching said air ports in the web joining the containers.

4. The apparatus of claim 1, wherein said apparatus is incorporated in a production system which performs steps of forming, filling and sealing containers.

5. An apparatus for testing a package comprising a container having an opening and a lid stock material covering said opening and sealed to said container for (a) container integrity, (b) seal integrity, and (c) seal strength, said apparatus comprising: a fixture including a first floor and a second floor, said first floor having a plurality of voids therein for receiving, respectively, a plurality of said packages; said first floor having air injection ports therein which are connected to an air source; said second floor having air tracks provided in a bottom surface thereof, said air tracks being designed to fit over the perimeter of the package's seal of the container and the lid stock material; an air cylinder in association with said second floor to actuate said second floor to move downwardly into contact with an upper surface of said first floor; proximity sensors associated with said second floor and positioned above said lid stock material for sensing movement in said lid stock material during testing; a computer processing unit electrically linked with said sensors for processing and recording output signals obtained from said sensors; and said computer being electrically linked with said air cylinder for actuating said air cylinder and with a valve in association with said air source for actuating said valve.

6. A method for testing the integrity of a plurality of packages, each said package comprising a container having an opening and a lid stock material covering said opening and sealed to said container, said method comprising the steps of: providing an apparatus in which to hold said packages to conduct said testing, said apparatus comprising: a fixture having a first floor and a second floor; an actuator in association with at least one of said floors to move one of said floors into contact with the other of said floors; means in association with said first floor for receiving said packages in such a manner that a rim of the container of each package rests on an upper surface of said first floor; said second floor having an air track in a bottom surface thereof to create a void pattern for air distribution under said lid stock material at a seal between the container and lid stock material of each said package; an air source for providing air to said lid stock material; and a sensor positioned in the fixture to detect movement of the lid stock material; arranging said packages into said first floor of said apparatus, such that said packages rest in said means for receiving in said first floor; moving said second floor of said apparatus into contact with the lid stock material of said package as said package rests in said first floor; injecting air into said air track under said lid stock material to cause said lid stock material to rise at corresponding locations into said air tracks; detecting movement of lid stock material with said sensors; and employing a computer to monitor movement of the lid stock material detected by said sensors, and to control said actuator, air source and the testing process.

7. The method of claim 6, further comprising cooling said seals between the cups and lid stock material prior to testing the integrity of said seals.

8. The method of claim 6, further comprising bringing a plurality of shells into a position surrounding the container of one of said packages; and providing air vacuum/pressure in a void between said shells and said container bodies and lids, to test for vacuum/pressure differences.

9. The method of claim 8, wherein said shells rest in an additional floor forming a part of said apparatus.

10. The method of claim 7, wherein said cooling of said seals is accomplished by injection of a cool fluid into cooling tunnels formed in said second floor.

11. The method of claim 6, wherein said computer is integrated with a production processing system, so that as defective seals are discovered the production process controls act to identify a container having a breached seal for removal prior to shipment.

12. The method of claim 6, wherein the containers of said packages comprise a flexible material.

13. The method of claim 6, wherein said lid stock material comprises a flexible, multilayered material.

14. The method of claim 12, wherein said containers comprise polypropylene/EVOH/polypropylene layers.

15. The method of claim 13, wherein said lid stock material comprises polypropylene/aluminum foil/polypropylene layers.

* * * * *